US009430246B2

(12) United States Patent
Park et al.

(10) Patent No.: US 9,430,246 B2
(45) Date of Patent: Aug. 30, 2016

(54) METHOD AND APPARATUS TO CONTROL BOOTING OF COMPUTER SYSTEM USING EXTENSIVE FIRMWARE INTERFACE

(71) Applicant: SAMSUNG Electronics Co., Ltd., Suwon-si, Gyeonggi-do (KR)

(72) Inventors: Seong-kook Park, Yongin-si (KR); Cho-won Kim, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 185 days.

(21) Appl. No.: 13/682,859

(22) Filed: Nov. 21, 2012

(65) Prior Publication Data
US 2013/0138941 A1 May 30, 2013

(30) Foreign Application Priority Data

Nov. 28, 2011 (KR) .................. 10-2011-0125213

(51) Int. Cl.
G06F 9/00 (2006.01)
G06F 9/44 (2006.01)
(52) U.S. Cl.
CPC .................. G06F 9/4401 (2013.01)
(58) Field of Classification Search
CPC .................................. G06F 9/4401
USPC .................. 713/1, 2; 718/104; 711/112
See application file for complete search history.

(56) References Cited

U.S. PATENT DOCUMENTS

| 6,199,159 | B1 * | 3/2001 | Fish ...................... G06F 9/4401 713/2 |
| 6,490,677 | B1 * | 12/2002 | Aguilar et al. ................... 713/1 |
| 6,934,833 | B2 * | 8/2005 | Larvoire ............................ 713/1 |
| 6,978,363 | B2 * | 12/2005 | Larvoire ................. G06F 9/441 713/1 |
| 7,484,083 | B1 * | 1/2009 | Ilyasov ............................. 713/1 |
| 8,095,753 | B1 * | 1/2012 | Pandey ................. G06F 3/0605 711/112 |
| 8,555,048 | B2 * | 10/2013 | Goldstein et al. ................ 713/2 |
| 8,671,270 | B2 * | 3/2014 | Oigawa et al. ................... 713/2 |
| 2003/0110370 | A1 * | 6/2003 | Fish et al. ........................ 713/2 |
| 2004/0068645 | A1 * | 4/2004 | Larvoire ................. G06F 9/441 713/1 |
| 2005/0114639 | A1 * | 5/2005 | Zimmer ....................... 712/244 |
| 2005/0144433 | A1 * | 6/2005 | Rothman et al. ................. 713/2 |
| 2005/0182913 | A1 * | 8/2005 | Zimmer ....................... 711/207 |
| 2005/0223307 | A1 * | 10/2005 | Wu et al. ...................... 715/500 |
| 2006/0010450 | A1 * | 1/2006 | Culter .......................... 718/104 |
| 2006/0020780 | A1 * | 1/2006 | Hobson .......................... 713/2 |
| 2006/0047941 | A1 * | 3/2006 | Lai ................................. 713/2 |
| 2008/0243465 | A1 * | 10/2008 | Bohizic et al. ................. 703/23 |
| 2008/0276123 | A1 * | 11/2008 | Sudhakar ............ G06F 11/1469 714/6.12 |
| 2008/0301424 | A1 * | 12/2008 | Barajas ............... G06F 11/1417 713/2 |
| 2009/0144754 | A1 * | 6/2009 | Zimmer et al. ............... 719/318 |
| 2011/0088082 | A1 * | 4/2011 | Locker et al. ................... 726/5 |
| 2011/0179261 | A1 * | 7/2011 | Tachibana ........................ 713/2 |
| 2012/0096319 | A1 * | 4/2012 | Wang et al. ..................... 714/45 |
| 2012/0191960 | A1 * | 7/2012 | Piwonka et al. .................. 713/2 |
| 2014/0047443 | A1 * | 2/2014 | Mann ............................. 718/1 |
| 2014/0089653 | A1 * | 3/2014 | Jang et al. ........................ 713/2 |

* cited by examiner

*Primary Examiner* — Aurel Prifti
(74) *Attorney, Agent, or Firm* — Staas & Halsey LLP

(57) ABSTRACT

A method of controlling booting of a computer system includes determining whether a booting mode of (BIOS) set is a first mode in which supportability of an EFI is automatically determined, if the booting mode of the BIOS is determined as the first mode, determining whether an OS that performs booting of the computer system supports the EFI, setting the booting mode of the BIOS as one of a mode in which the EFI is supported and a mode in which the EFI is not supported.

18 Claims, 8 Drawing Sheets

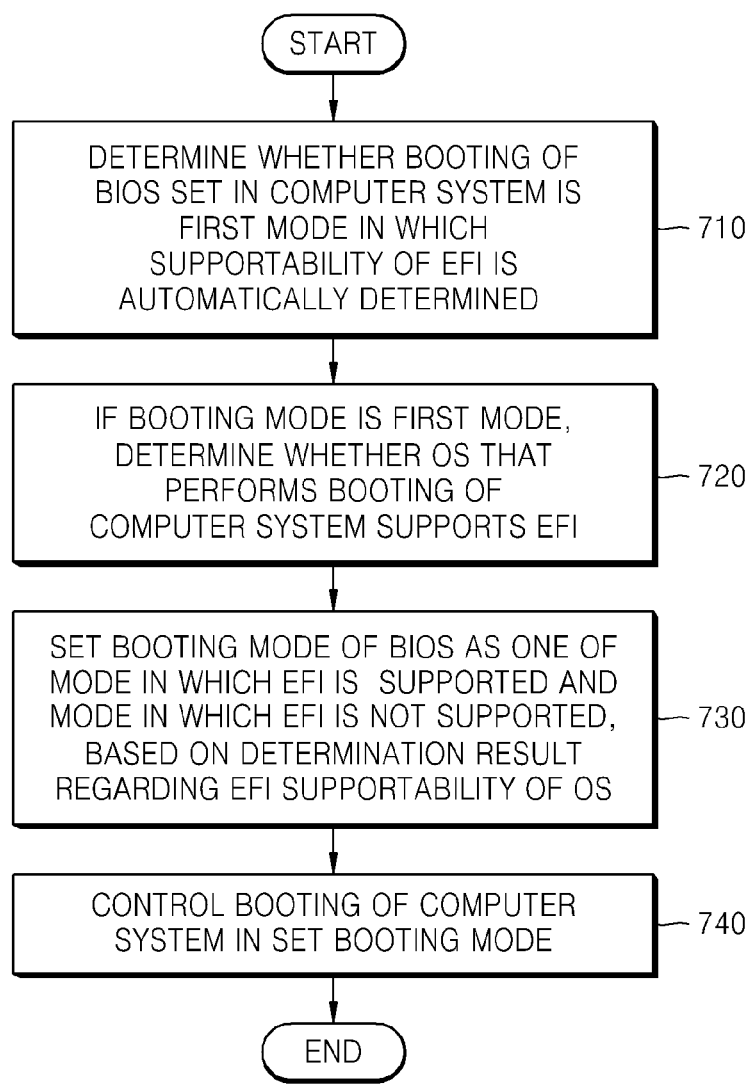

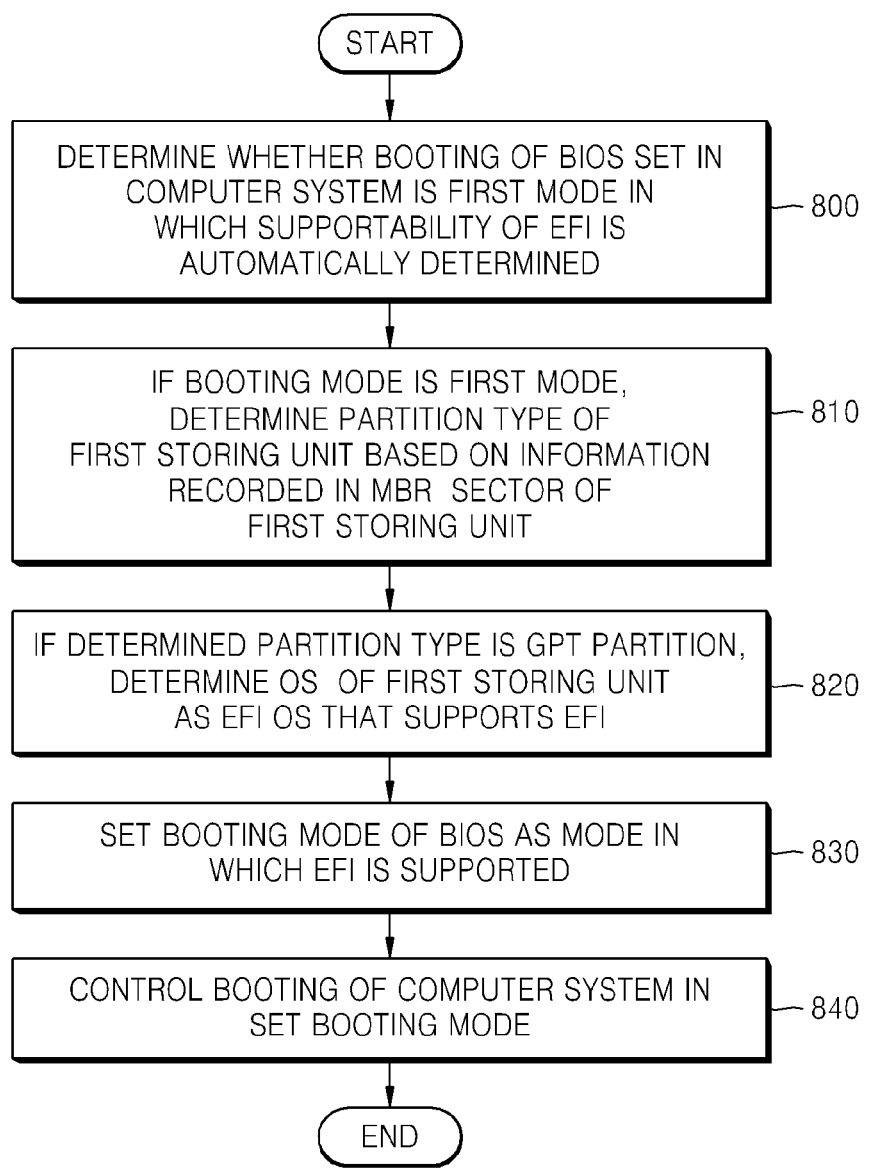

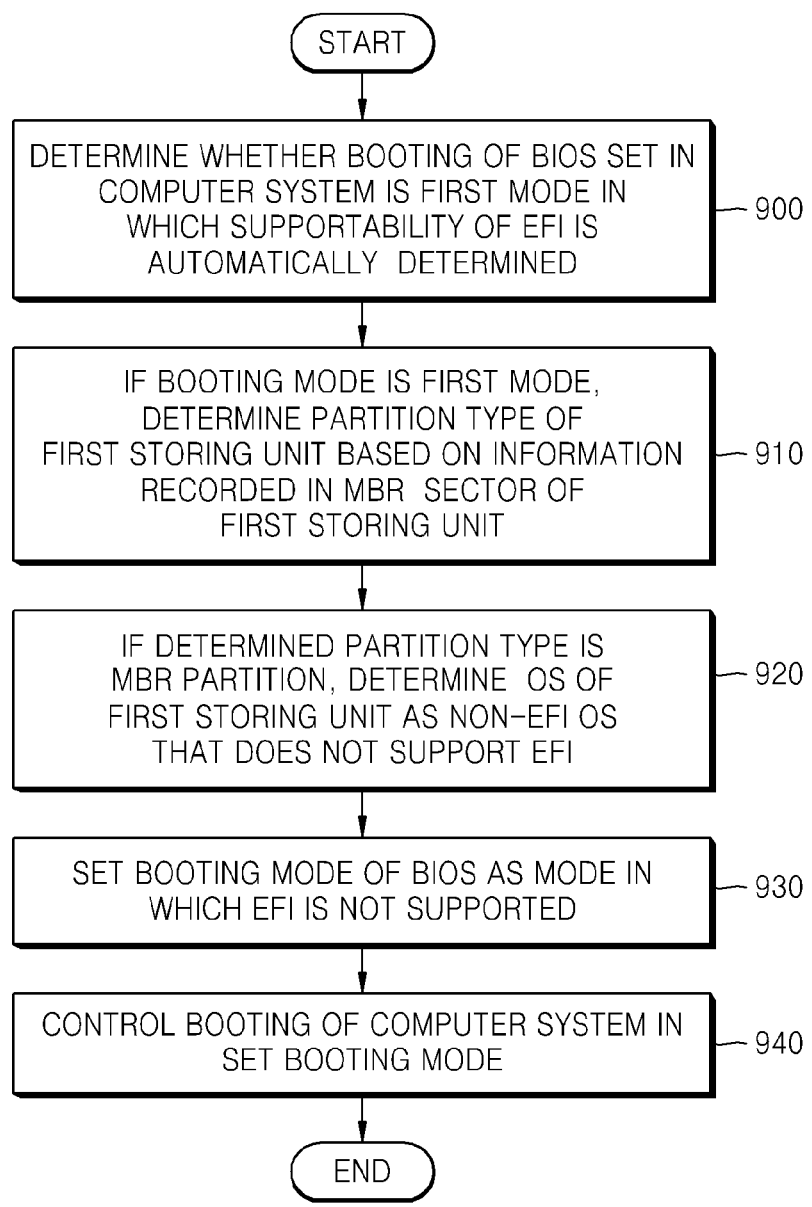

METHOD AND APPARATUS TO CONTROL BOOTING OF COMPUTER SYSTEM USING EXTENSIVE FIRMWARE INTERFACE

CROSS-REFERENCE TO RELATED APPLICATIONS

This application claims priority under 35 U.S.C. §119 from Korean Patent Application No. 10-2011-0125213, filed on Nov. 28, 2011, in the Korean Intellectual Property Office, the disclosure of which is incorporated herein in its entirety by reference.

BACKGROUND OF THE INVENTION

1. Field of the Invention

The present general inventive concept relates to a method and apparatus to control booting of a computer system depending on supportability of an extensible firmware interface (EFI).

2. Description of the Related Art

A conventional computer system performs a booting operation using a basic input/output system (BIOS). However, the conventional computer system does not provide variable setup values of a basic input/output system (BIOS) option to simultaneously support an operating system (OS) that supports an extensible firmware interface (EFI) via one BIOS and an OS that does not support an EFI.

SUMMARY OF THE INVENTION

The present general inventive concept provides a method and apparatus to control booting of a computer system so that a user may use more conveniently, and a computer-readable medium having recorded thereon a program to execute the method.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a method of controlling booting of a computer system, the method including determining whether a booting mode of a basic input/output system (BIOS) set in the computer system is a first mode in which supportability of an extensible firmware interface (EFI) is automatically determined, determining whether an operating system (OS) supports the EFI when the booting mode of the BIOS is determined as the first mode, wherein the operating system (OS) is stored in a first storing unit and performs booting of the computer system, setting the booting mode of the BIOS as one of a mode in which the EFI is supported and a mode in which the EFI is not supported, based on the determination result regarding whether the OS supports the EFI, and controlling booting of the computer system in the set booting mode.

The foregoing and/or other features and utilities of the present general inventive concept may also be achieved by providing a method of setting a booting mode of a basic input/output system (BIOS) of a computer system, the method including generating a first mode in which supportability of an extensible firmware interface (EFI) of an operating system (OS) is automatically determined, and a second mode in which EFI supportability of the OS is manually determined by a user's selection, and displaying the first mode and the second mode that are generated.

The foregoing and/or other features and utilities of the present general inventive concept may also be achieved by providing an apparatus to control booting of a computer system, the apparatus including a first determining unit to determine whether a booting mode of a basic input/output system (BIOS) set in the computer system is a first mode in which supportability of an extensible firmware interface (EFI) is automatically determined, and a second determining unit to determine whether an operating system (OS) supports the EFI, if the booting mode of the BIOS is determined as the first mode, wherein the operating system (OS) is stored in a first storing unit and performs booting of the computer system, a setting unit to set the booting mode of the BIOS as one of a mode in which the EFI is supported and a mode in which the EFI is not supported, based on the determination result regarding whether the OS supports the EFI, and a controlling unit to control booting of the computer system in the set booting mode.

The foregoing and/or other features and utilities of the present general inventive concept may also be achieved by providing a computer system including a first storing unit to store an operating system (OS), a second storing unit to store a basic input/output system (BIOS), and an apparatus to control booting of the computer system by loading the OS stored in the first storing unit by using the BIOS stored in the second storing unit, wherein the apparatus to control booting of the computer system includes a first determining unit to determine whether a booting mode of a basic input/output system (BIOS) set in the computer system is a first mode in which supportability of an extensible firmware interface (EFI) is automatically determined, a second determining unit to determine whether an operating system (OS) that is stored in a first storing unit to perform booting of the computer system supports the EFI, if the booting mode of the BIOS is determined as the first mode, a setting unit to set the booting mode of the BIOS as one of a mode in which the EFI is supported and a mode in which the EFI is not supported, based on the determination result regarding whether the OS supports the EFI, and a controlling unit to control booting of the computer system in the set booting mode.

The foregoing and/or other features and utilities of the present general inventive concept may also be achieved by providing a computer-readable medium having recorded thereon a program to execute the method of controlling booting of a computer system.

The foregoing and/or other features and utilities of the present general inventive concept may also be achieved by providing a computer system including a storing unit to store a basic input/output system (BIOS) with information on a setup mode and supportability of an extensible firmware interface (EFI), and to store an operating system (OS) with an EFI OS and a non-EFI OS, and a control unit to determine the supportability of the extensible firmware interface according to the setup mode and a partition type included in the information of the BOIS stored in the storing unit, and to control booting using one of the EFI OS and the non-EFI OS of the OS stored in the storing unit according to the determined supportability.

The foregoing and/or other features and utilities of the present general inventive concept may also be achieved by providing a method of controlling booting of a computer system, the method including determining supportability of an extensible firmware interface (EFI) according to a setup mode and a partition type of information of a basic input/ output system (BIOS) stored in a storing unit of the computer system, and controlling booting according to the determined supportability and one of an EFI OS and a non-EFI OS of an OS stored in the storing unit of the computer system.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 7 is a flowchart illustrating a method of controlling booting of a computer system according to an embodiment of the present general inventive concept;

FIG. 8 is a flowchart illustrating a method of controlling booting of a computer system such that a booting mode of a BIOS is controlled according to types of partitions of a first storing unit according to an embodiment of the present general inventive concept; and FIG. 9 is a flowchart illustrating a method of controlling booting of a computer system such that a booting mode of a BIOS is controlled according to types of partitions of a first storing unit according to another embodiment of the present general inventive concept.

DETAILED DESCRIPTION OF THE PREFERRED EMBODIMENTS

Figure 1:
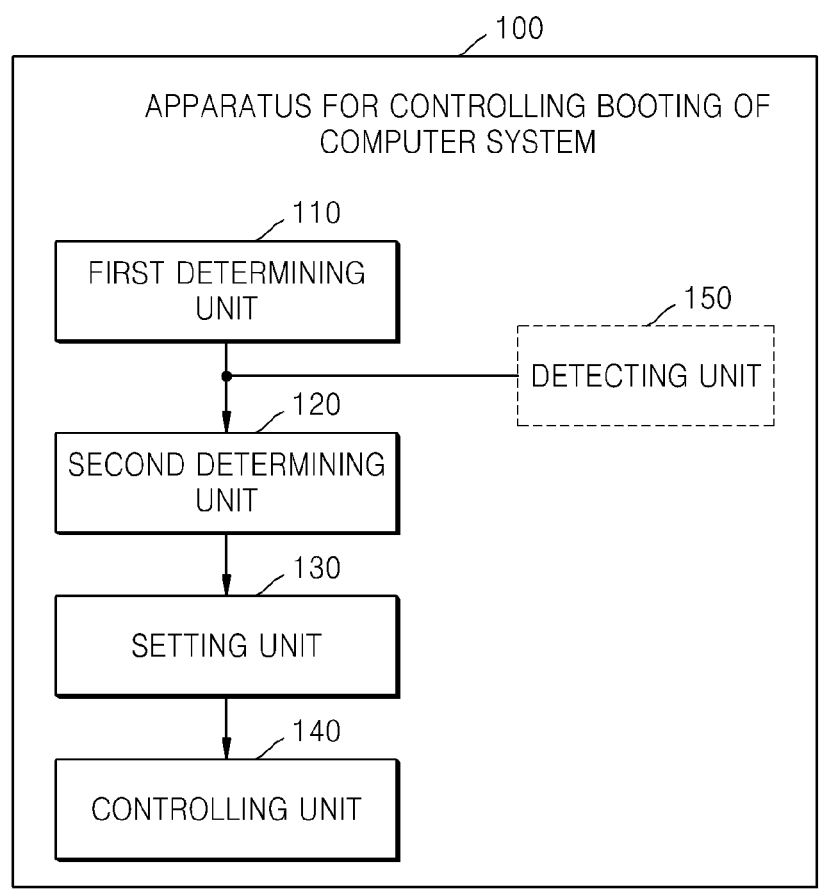
FIG. 1 is a block diagram illustrating an apparatus to control booting of a computer system according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 is a block diagram illustrating an apparatus 100 to control booting of a computer system according to an embodiment of the present general inventive concept.

Referring to FIG. 1, the apparatus 100 to control booting of the computer system may include a first determining unit 110, a second determining unit 120, a setting unit 130, a controlling unit 140, and a detecting unit 150. The overall structure of a computer system including the apparatus 100 to control booting of the computer system will be described below with reference to FIG. 2 in detail.

The apparatus 100 controls a booting operation of the computer system according to a booting mode of a basic input/output system (BIOS) set in the computer system. The apparatus 100 to control booting of the computer system may be implemented as a processor.

The first determining unit 110 determines whether a booting mode of the BIOS set in the computer system is a first mode in which supportability of an extensible firmware interface (EFI) is automatically determined.

The BIOS as a program to process a fundamental function of the computer system by controlling the computer system when power is supplied to the computer system may be stored in a BIOS read-only memory (ROM) in the computer system or an external device connectable to the computer system.

The EFI as an architecture to boot firmware is described below with reference to FIG. 3 in detail.

If power is applied to the computer system, booting of the computer system is performed according to BIOS setup values. The BIOS setup values may be included in the BIOS. The first determining unit 110 determines whether the booting mode of the BIOS is set as the first mode.

The first mode refers to a mode in which the booting mode of the BIOS set in the computer system automatically determines supportability of the EFI and booting of the computer system is performed. A second mode in which supportability of the EFI is not automatically determined but determined by a user's selection will be described below with reference to FIG. 5 in detail.

The second determining unit 120 determines whether an operating system (OS) to perform booting of the computer system supports the EFI when the booting mode of the BIOS is determined as the first mode. The OS performs overall management and control of hardware and software components of the computer system and may be stored in a recording medium, such as a hard disc, of the computer system.

The second determining unit 120 determines whether the OS supports the EFI when the determination result of the first determining unit 110 is the first mode. It may be determined whether the OS supports the EFI according to types of partitions of the recording medium in which the OS is stored, and types of partitions of the recording medium may be determined based on information recorded in a master boot record (MBR) sector of the recording medium.

The types of partitions of the recording medium determined based on information recorded in the MBR sector may include an MBR partition and a global unique identifier (GUID) partition table (GPT) partition. The MBR partition and the GPT partition will be described later with reference to FIGS. 4 and 5 in detail.

It is possible to determine whether the EFI is supported according to a structure of the GPT partition of the recording medium. When a partition type is determined as the GPT partition, the OS stored in the recording medium may be determined as an EFI OS that supports the EFI.

When a partition type is determined as the MBR partition according to the determination result based on the information recorded in the MBR sector, the OS stored in the recording medium may be determined as a Non-EFI OS that does not support the EFI.

The setting unit 130 sets the booting mode of the BIOS as a mode in which the EFI is supported, or a mode in which the EFI is not supported, depending on whether the OS is an EFI OS that supports the EFI.

When the second determining unit 120 determines the OS as the EFI OS, the setting unit 130 sets the booting mode of the BIOS as a mode in which the EFI is supported.

When the second determining unit 120 determines the OS as the Non-EFI OS, the setting unit 130 sets the booting mode of the BIOS as a mode in which the EFI is not supported.

The controlling unit 140 controls booting of the computer system in the set booting mode.

For example, when the booting mode of the BIOS is set as the mode in which the EFI is supported, a partition type of the recording medium is a GPT partition.

As the setting unit 130 sets the booting mode of the BIOS as the mode in which the EFI is supported, the controlling unit 140 controls the computer system to be booted by loading the EFI OS stored in the recording medium.

For another example, when the booting mode of the BIOS is set as the mode in which the EFI is not supported, a partition type of the recording medium is an MBR partition.

As the setting unit 130 sets the booting mode of the BIOS as the mode in which the EFI is not supported, the controlling unit 140 controls the computer system to be booted by loading the Non-EFI OS stored in the recording medium.

When the computer system includes a plurality of recording media, the detecting unit 150 detects a recording medium that directly involves booting from among a plurality of recording media and the first determining unit 110 determines the booting mode of the BIOS as the first mode. In this case, the second determining unit 120 determines supportability of the EFI on the OS stored in the detected booting recording medium in the same manner described above.

When the computer system including a recording medium in which the Non-EFI OS is stored is booted in the booting mode of the BIOS in which the EFI is supported, the recording medium for the GPT partition has not been verified, and unexpected problems may occur, and thus, the BIOS setup values need to be maintained in the mode in which the EFI is not supported.

On the other hand, when the computer system including a recording medium in which the EFI OS is stored is booted in the booting mode of the BIOS in which the EFI is not supported, it is impossible to perform booting of the computer system, and thus, the BIOS setup values need to be maintained in the mode in which the EFI is supported.

The BOIS setup values may be variable so that the EFI OS and the Non-EFI OS can be simultaneously supported by one BIOS. In this case, there is the possibility that errors may occur when a user varies the BIOS setup values.

Thus, in the first mode, the user may use the EFI OS and the Non-EFI OS normally without additional settings so that the possibility of error occurrence may be minimized. In the second mode, the user may select a mode in which the EFI is supported or is not supported, by varying the BIOS setup values as occasion demands.

Figure 2:
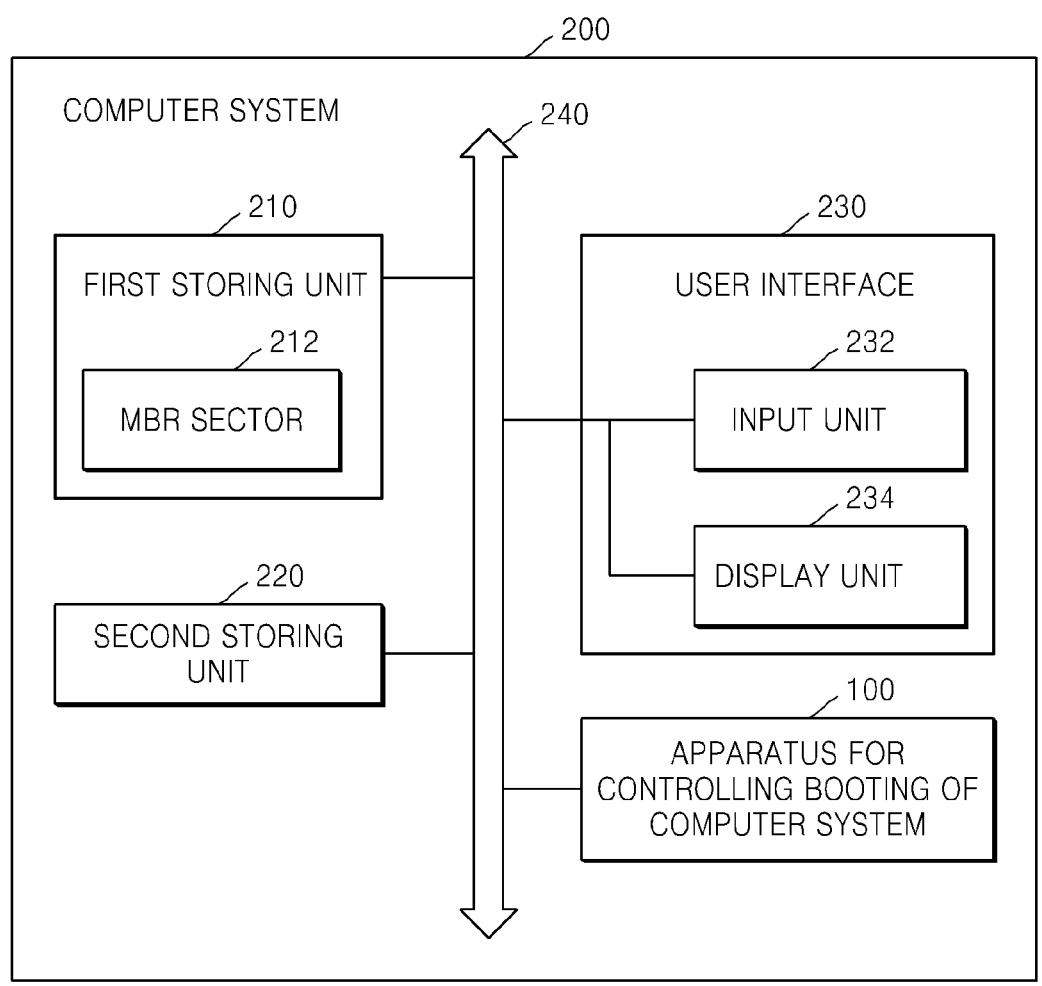
FIG. 2 is a block diagram illustrating a computer system according to an embodiment of the present general inventive concept.

FIG. 2 is a block diagram illustrating a computer system 200 according to an embodiment of the present general inventive concept.

Referring to FIG. 2, the computer system 200 may include a first storing unit 210, a second storing unit 220, a user interface 230, and the apparatus 100 of FIG. 1 to control booting of the computer system 200. However, the present general inventive concept is not limited thereto. The computer system 200 may further include other elements than the elements illustrated in FIG. 2. For example, the computer system 200 may include a functional unit to perform data processing, audio or video signal processing, etc.

The computer system 200 may be a system to include a central processing unit (CPU), an input/output unit, and peripheral devices, which are connected to one another, according to a usage or environment of the system or a user preference. The computer system 200 may be a general purpose computer, a notebook computer, a laptop computer, a personal digital assistant (PDA), a mobile phone, a tablet computer apparatus, an audio and/or video apparatus, an image forming apparatus, or the like.

The first storing unit 210 may store an OS (not illustrated) and may include an MBR sector 212 embedded in the first storing unit 210. In this case, the first storing unit 210 may be the recording medium described with reference to FIG. 1.

The first storing unit 210 may be a hard disc, a universal serial bus (USB) memory, a solid state drive (SSD), a flash memory, or the like. The MBR sector 212 is a system start-up region recorded in a front end of data regions of the first storing unit 210 and will be described below with reference to FIGS. 4 and 5 in detail.

In addition, the structure of the first storing unit 210 may be a GPT partition that supports the EFI, or an MBR partition that does not support the EFI. This will be described with reference to FIGS. 4 and 5 in detail.

As described above with reference to FIG. 1, when the computer system 200 may include a plurality of storing units, the first determining unit 110 may detect the first storing unit 210 that directly involves booting from among the plurality of storing units and the booting mode of the BIOS is determined as the first mode.

The second storing unit 220 stores the BIOS (not illustrated) of the computer system 200 and stores setup information inputted via a user interface 230. The BIOS may be AWARD BIOS, AMI BIOS, PHOENIX BIOS, or the like. The second storing unit 220 to store the BIOS may be a BIOS ROM.

The user interface 230 may include an input unit 232 and a display unit 234. If a user's input relating to booting of the computer system 200 is required, setup information is inputted by the user to the input unit 232, and the input result is displayed on the display unit 234. The input unit 232 may include a keyboard, a mouse, and the like, and a software module to drive the keyboard, the mouse, and the like. The display unit 234 may be a monitor. A touch pad may be used as the display unit 234 and the input unit 232.

The display unit 234 may display a first mode in which the EFI is automatically determined, and a second mode in which supportability of the EFI is manually determined by a user's selection, as will be described below with reference to FIG. 6 in detail.

The elements of the computer system 200 may be connected to one another by a system bus 240, and information regarding the elements of the computer system 200 may be transmitted by the system bus 240 to perform functions of the computer system 200. By using the above-described method, the apparatus 100 to control booting of a computer system may control booting of the computer system 200 without errors according to the type of OS stored in the first storing unit 210.

Figure 3:
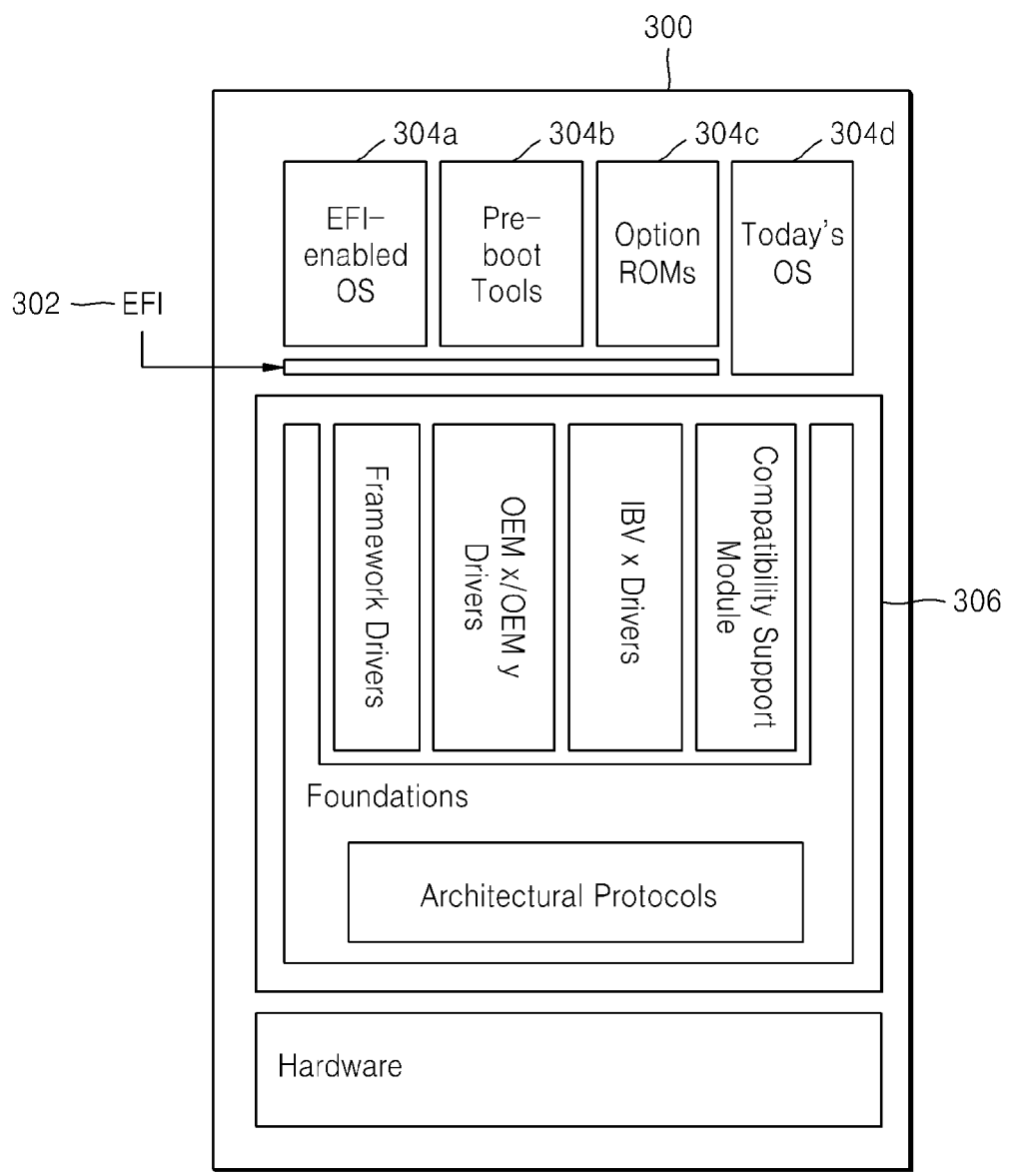
FIG. 3 is a diagram illustrating an extensible firmware interface (EFI) according to an embodiment of the present general inventive concept.

FIG. 3 illustrates an extended firmware interface (EFI) 302 according to an embodiment of the present general inventive concept. The EFI 302 may be included in an architecture 300 of a computer system as illustrated in FIG. 3.

The EFI 302 is a specification to define a software interface between the OS and platform firmware, is an architecture to boot firmware, and is referred to as a unified EFI (UEFI). The EFI 302 may be located between platform firmware 306 and a section formed with OSs 304a and 304d, option ROMs 304c, pre-boot tools 304b.

The platform firmware 306 may include framework drivers, OEM Drivers, IBV drivers, compatibility support module and architectural protocols as foundations. The architecture 302 may include one or more hardware components to support the function of the computer system.

The purpose of the EFI 302 is to neutralize an OS and to modularize and implement functions of the BIOS so that the EFI 302 may be easily extended compared to an existing legacy BIOS and a free BIOS environment in which the functions of the BIOS are independent from one another is established.

Figure 4:
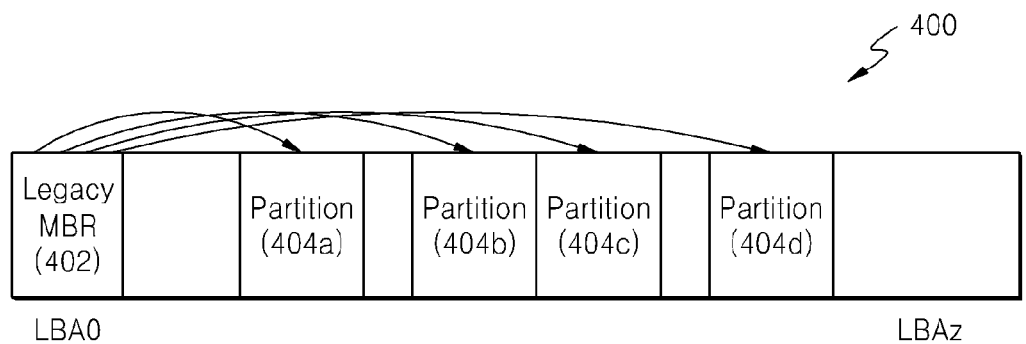
FIG. 4 illustrates a recording medium having a master boot record (MBR) partition structure according to an embodiment of the present general inventive concept.

FIG. 4 illustrates a recording medium 400 having an MBR partition structure according to an embodiment of the present general inventive concept. The MBR sector 212 of FIG. 2 may include LBA0 as a first logical block address (LBA) of the recording medium 400.

The MBR sector 212 of the recording medium 400 having the MBR partition structure is shown as a legacy MBR sector 402, and disc information and partition tables of partitions 404a, 404b, 404c, and 404d may be recorded in the legacy MBR sector 402.

Figure 5:
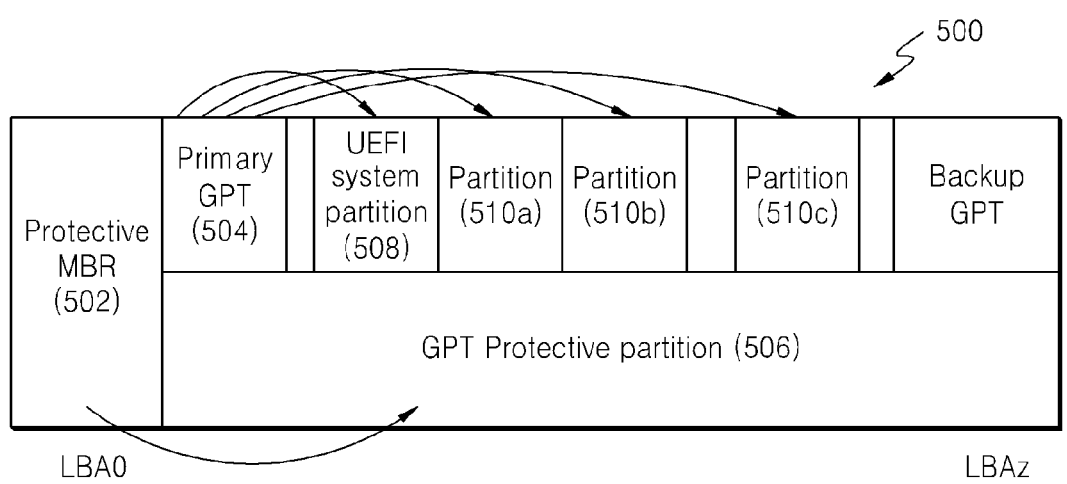
FIG. 5 illustrates a recording medium having a global unique identifier (GUID) partition table (GPT) partition according to an embodiment of the present general inventive concept.

FIG. 5 illustrates a recording medium 500 having a structure of a GPT partition according to an embodiment of the present general inventive concept. FIG. 5 illustrates the MBR sector 212 of FIG. 2 to include LBA0 as a first LBA of the recording medium 500 like the MBR partition of FIG. 4.

A difference between the GPT partition and the MBR partition is that information regarding a GPT protective partition 506 is recorded in the MBR sector 212 of the GPT partition. Thus, the MBR sector 212 of the recording medium 500 having the GPT partition structure is illustrated as a protective MBR sector 502.

A primary GPT header 504 acts as the MBR sector 212 in the MBR partition. Information regarding a unified EFI (UEFI) system partition 508 and other partitions 510a, 510b, and 510c are recorded in the primary GPT header 504.

In this way, since different pieces of information are recorded in the legacy MBR sector 402 in the MBR partition and the protective MBR sector 502 in the GPT partition, the second determining unit 120 may determine the type of partition of the first storing unit 210 based on the information recorded in the MBR sector 212 of the first storing unit 210.

Figure 6:
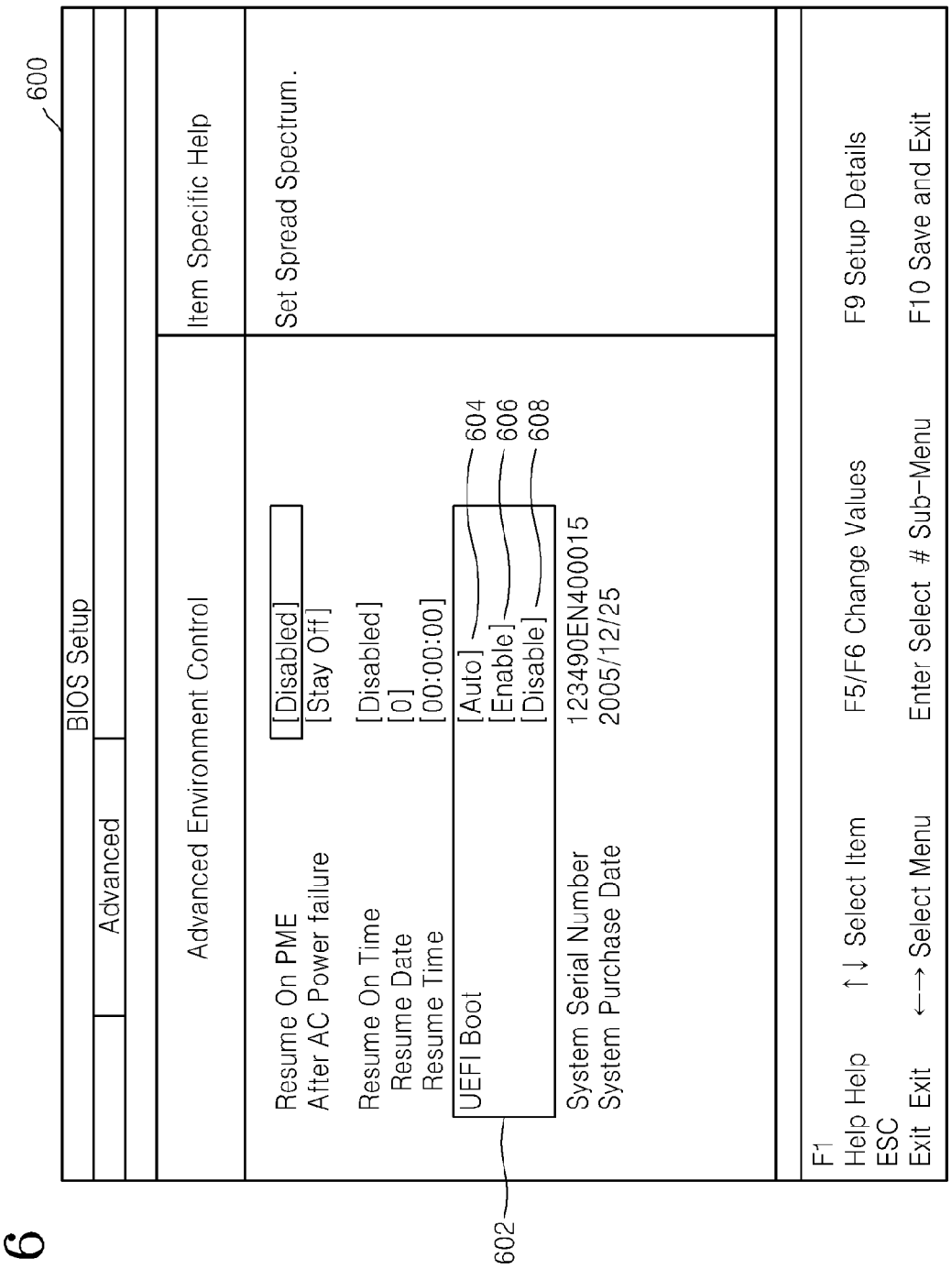
FIG. 6 illustrates a booting mode displayed on a basic input/output system (BIOS) setup screen according to an embodiment of the present general inventive concept.

FIG. 6 illustrates a BIOS setup screen 600 of the computer system 200 of FIG. 2.

A UEFI booting mode 602 of the BIOS setup screen 600 generates a first mode 604 in which supportability of the EFI is automatically determined, and second modes 606 and 608 in which supportability of the EFI is manually determined by a user's selection.

The first mode 604 and the second modes 606 and 608 are displayed on the BIOS setup screen 600, and the user may see the first mode 604 and the second modes 606 and 608 displayed on the display unit 234 of the user interface 230. In the second modes 606 and 608, the user may vary BIOS setup arbitrarily via the input unit 232 of the user interface 230.

The second modes 606 and 608 are modes in which the user manually determines whether the computer system 200 is to be booted in a mode in which the EFI is supported, based on predetermined values. When the computer system 200 is determined to be booted in the mode 606 in which the EFI is supported, the computer system 200 is booted by the EFI OS, and when the computer system 200 is determined to be booted in the mode 608 in which the EFI is not supported, the computer system 200 is booted by the Non-EFI OS.

The BIOS setup screen 600 may also include a BIOS setup section having an advanced section with setup or control portions other than the UEFI booting mode 602. The Setup or control portions are well known, and thus detailed descriptions will be omitted.

FIGS. 7 through 9 are flowcharts illustrating methods of controlling booting of a computer system according to embodiments of the present general inventive concept. The methods of controlling booting of a computer system illustrated in FIGS. 7 through 9 each include operations to be performed by using, for example, the computer system 200, the apparatus 100 to control booting of the computer system 200, the first storing unit 210, the second storing unit 220, and the user interface 230 as illustrated in FIGS. 1 through 6. Thus, the features, the descriptions or the functions of the computer system 200, the apparatus 100 for controlling booting of a computer system, the first storing unit 210, the second storing unit 220, and the user interface 230 illustrated in FIGS. 1 through 6 may be also applied to FIGS. 7 through 9.

FIG. 7 is a flowchart illustrating a booting method of the computer system 200 of FIG. 2 according to an embodiment of the present general inventive concept.

In operation 710, the first determining unit 110 determines whether a booting of the BIOS set in the computer system 200 is the first mode 604 in which supportability of the EFI is automatically determined. As described above, there may be the second modes 606 and 608 in which supportability of the EFI is manually determined by a user's selection. In the second mode, the booting of the computer system 200 can be performed according to the user's selection (user's manual setup), and it is possible that an error occurs when the booting is performed according to user's selection.

In operation 720, if the booting mode determined in operation 710 is the first mode 604, the second determining unit 120 determines whether the OS that performs booting of the computer system 200 and is stored in the first storing unit 210 supports the EFI.

If the determination result of operation 710 is the second modes 606 and 608, as described above, the computer system 200 is booted in the mode in which the EFI is supported or is not supported, according to a user's selection.

In this case, in operation 720, the second determining unit 120 may determine the type of a partition of the first storing unit 210 based on information recorded in the MBR sector 212 of the first storing unit 210. The partition type of the first storing unit 210 may be a GPT partition or an MBR partition.

When the partition type of the first storing unit 210 is a GPT partition, the EFI OS that supports the EFI is determined, and when the partition type of the first storing unit 210 is an MBR partition, the Non-EFI OS that does not support the EFI is determined.

In operation 730, the setting unit 130 sets the booting mode of the BIOS as one of the modes in which the EFI is supported and in which the EFI is not supported, based on the determination result of operation 720 regarding EFI supportability of the OS.

In detail, when the OS stored in the first storing unit 210 is the EFI OS, the booting mode of the BIOS is set as the mode in which the EFI is supported. However, when the OS stored in the first storing unit 210 is the Non-EFI OS, the booting mode of the BIOS is set as the mode in which the EFI is not supported.

In operation 740, the controlling unit 140 controls booting of the computer system 200 according to the booting mode set in operation 730.

When the booting mode of the BIOS is set as the mode in which the EFI is supported, the controlling unit 140 controls the computer system 200 to be booted by loading the EFI OS. When the booting mode of the BIOS is set as the mode in which the EFI is not supported, the controlling unit 140 controls the computer system 200 to be booted by loading the Non-EFI OS.

FIG. 8 is a flowchart illustrating a booting method of the computer system 200 of FIG. 2 to be performed using a type of partition according to an embodiment of the present general inventive concept.

In operation 800, the first determining unit 110 determines whether the booting mode of the BIOS set in the computer system 200 is the first mode 604.

In operation 810, if the booting mode determined in operation 800 is the first mode 604, the first determining unit 110 determines a partition type of the first storing unit 210 based on information recorded in an MBR sector of the first storing unit 210.

If the partition type of the first storing unit 210 is determined as a GPT partition by the second determining unit 120 in operation 810, the second determining unit 120 determines the OS of the first storing unit 210 as the EFI OS that supports the EFI in operation 820.

In operation 830, the setting unit 130 sets the booting mode of the BIOS as a mode in which the EFI is supported, and in operation 840, booting of the computer system 200 is controlled by the controlling unit 140 in the set booting mode.

FIG. 9 is a flowchart illustrating a booting method of the computer system 200 of FIG. 2 to be performed using another type of a partition according to an embodiment of the present general inventive concept.

In operation 900, the first determining unit 110 determines whether the booting mode of the BIOS set in the computer system 200 is the first mode 604.

When a partition type of the first storing unit 210 is determined as an MBR partition by the second determining unit 120 in operation 910, the second determining unit 120 determines the OS of the first storing unit 210 as the Non-EFI OS that does not support the EFI in operation 920.

The setting unit 130 sets the booting mode of the BIOS as a mode in which the EFI is not supported in operation 930, and booting of the computer system 200 is controlled by the controlling unit 140 in the set booting mode in operation 940.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), flash memory, CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As described above, according to the present general inventive concept, a user may use an EFI OS that supports an EFI and a Non-EFI OS that does not support the EFI normally by using one BIOS without additional settings so that the possibility of error occurrence may be minimized. In addition, the user may select a mode in which the EFI is supported or is not supported, by varying the BIOS setup values as occasion demands.

According to an embodiment of the present general inventive concept, the user inconvenience to have to change BIOS setup values according to the type of an OS stored in the computer system and the possibility of error occurrence can be prevented.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of controlling booting of a computer system, the method comprising:
   determining whether a booting mode of a basic input/output system (BIOS) set in the computer system is a first mode in which supportability of an extensible firmware interface (EFI) is automatically determined;
   determining whether an operating system (OS) supports the EFI when the booting mode of the BIOS is determined as the first mode, wherein the operating system (OS) performs booting of the computer system;
   setting the booting mode of the BIOS as one of a mode in which the EFI is supported and a mode in which the EFI is not supported, based on a result of the determination regarding whether the OS supports the EFI; and
   controlling booting of the computer system in the set booting mode,
   wherein if a type of a partition of a recording medium in which the OS is stored is a global unique identifier (GUID) partition table (GPT) partition, the OS is determined to support the EFI, and if the type of the partition of the recording medium in which the OS is stored is a master boot record (MBR) partition, the OS is determined not to support the EFI.

2. The method of claim 1, wherein the determining whether the OS supports the EFI comprises determining the OS as an OS that supports the EFI if the type of the partition of the recording medium is a GPT partition, and
   the setting of the booting mode of the BIOS comprises setting the booting mode of the BIOS as a mode in which the EFI is supported.

3. The method of claim 1, wherein the determining whether the OS supports the EFI comprises determining the OS as an OS that does not support the EFI if the type of the partition of the recording medium is an MBR partition, and
   the setting of the booting mode of the BIOS comprises setting the booting mode of the BIOS as a mode in which the EFI is not supported.

4. The method of claim 1, further comprising displaying the first mode, and a second mode in which supportability of the EFI is manually determined by a user's selection.

5. The method of claim 1, further comprising, if the computer system further comprises a plurality of storages, detecting the first recording medium in which the OS is stored, from among the plurality of storages, wherein the determining whether the OS supports the EFI comprises determining whether the OS stored in the determined recording medium supports the EFI.

6. A non-transitory computer-readable recording medium having recorded thereon a program for executing the method of claim 1.

7. A method of setting a booting mode of a basic input/output system (BIOS) of a computer system, the method comprising:
generating a first mode in which supportability of an extensible firmware interface (EFI) of an operating system (OS) is automatically determined, and a second mode in which EFI supportability of the OS is manually determined by a user's selection; and
displaying the first mode and the second mode that are generated,
wherein if a type of a partition of a recording medium in which the OS is stored is a global unique identifier (GUID) partition table (GPT) partition, the OS is determined to support the EFI, and if the type of the partition of the recording medium in which the OS is stored is a master boot record (MBR) partition, the OS is determined not to support the EFI.

8. The method of claim 7, further comprising:
receiving selection information from a user to select the first mode; and
when the booting mode of the BIOS is set as the first mode based on the received selection information, setting the booting mode of the BIOS as one of a mode in which the EFI is supported and a mode in which the EFI is not supported, based on the EFI supportability of the OS.

9. The method of claim 7, further comprising:
receiving selection information from a user to select the second mode; and
when the booting mode of the BIOS is set as the second mode based on the received selection information, setting the booting mode of the BIOS as one of a mode in which the EFI is supported and a mode in which the EFI is not supported, based on the selection information.

10. A non-transitory computer-readable recording medium having recorded thereon a program to execute the method of claim 7.

11. An apparatus to control booting of a computer system, the apparatus comprising:
a processor to:
determine whether a booting mode of a basic input/output system (BIOS) set in the computer system is a first mode in which supportability of an extensible firmware interface (EFI) is automatically determined,
determine whether an operating system (OS) supports the EFI, when the booting mode of the BIOS is determined as the first mode, wherein the operating system (OS) performs booting of the computer system, and
set the booting mode of the BIOS as one of a mode in which the EFI is supported and a mode in which the EFI is not supported, based on a result of the determination regarding whether the OS supports the EFI, and
a controller to control the booting of the computer system in the set booting mode,
wherein if a type of a partition of a recording medium in which the OS is stored is a global unique identifier (GUID) partition table (GPT) partition, the OS is determined to support the EFI, and if the type of the partition of the recording medium in which the OS is stored is a master boot record (MBR) partition, the OS is determined not to support the EFI.

12. The apparatus of claim 11, wherein, when the type of the partition of the recording medium is a GPT partition, the processor determines the OS as an OS that supports the EFI, and sets the booting mode of the BIOS as a mode in which the EFI is supported.

13. The apparatus of claim 12, wherein, when the type of the partition of the first recording medium is an MBR partition, the processor determines the OS as an OS that does not support the EFI, and the sets the booting mode of the BIOS as a mode in which the EFI is not supported.

14. The apparatus of claim 11, further comprising:
a displayer to display the first mode and a second mode in which supportability of the EFI is manually determined by a user's selection.

15. The apparatus of claim 11, further comprising:
a plurality of storages; and
wherein the processor is configured to:
detect the recording medium in which the OS is stored, from among the plurality of storages,
determine whether the OS stored in the determined recording medium supports the EFI.

16. A computer system comprising:
a first storage to store an operating system (OS);
a second storage to store a basic input/output system (BIOS);
an apparatus to control booting of the computer system by loading the OS stored in the first storage by using the BIOS stored in the second storage,
wherein the apparatus to control booting of the computer system comprises:
a processor to:
determine whether a booting mode of the basic input/output system (BIOS) set in the computer system is a first mode in which supportability of an extensible firmware interface (EFI) is automatically determined;
determine whether the operating system (OS) that is stored in the first storage and perform booting of the computer system supports the EFI, if the booting mode of the BIOS is determined as the first mode;
set the booting mode of the BIOS as one of a mode in which the EFI is supported and a mode in which the EFI is not supported, based on a result of the determination regarding whether the OS supports the EFI; and
a controller to control booting of the computer system in the set booting mode,
wherein if a type of a partition of the first storage in which the OS is stored is a global unique identifier (GUID) partition table (GPT) partition, the OS is determined to support the EFI, and if the type of the partition of the first storage in which the OS is stored is a master boot record (MBR) partition, the OS is determined not to support the EFI.

17. A computer system comprising:
a storage to store a basic input/output system (BIOS) with information on a setup mode and supportability of an extensible firmware interface (EFI), and to store an operating system (OS) with an EFI OS and a non-EFI OS; and a controller to determine the supportability of the extensible firmware interface according to the setup mode and a partition type included in the information of the BOIS stored in the storage, and to control booting using one of the EFI OS and the non-EFI OS of the OS stored in the storage according to the determined supportability, wherein if a type of a partition of the storage in which the OS is stored is a global unique identifier (GUID) partition table (GPT) partition, the OS is determined to support the EFI, and if the type of the partition of the storage in which the OS is stored is a master boot record (MBR) partition, the OS is determined not to support the EFI.

18. A method of controlling booting of a computer system, the method comprising:

determining supportability of an extensible firmware interface (EFI) according to a setup mode and a partition type of information of a basic input/output system (BIOS) stored in the computer system; and controlling booting according to the determined supportability and one of an EFI OS and a non-EFI OS of an OS stored in the computer system, wherein if a type of a partition of a recording medium in which the OS is stored is a global unique identifier (GUID) partition table (GPT) partition, the OS is determined to support the EFI, and if the type of the partition of the recording medium in which the OS is stored is a master boot record (MBR) partition, the OS is determined not to support the EFI.

* * * * *